United States Patent
Miller

[19]

[11] Patent Number: 5,937,537
[45] Date of Patent: Aug. 17, 1999

[54] COMBINATION HAIR DRYER AND STAND

[76] Inventor: Leticia Miller, 104 San Juan Ave., Redlands, Calif. 92374

[21] Appl. No.: 09/157,066

[22] Filed: Sep. 18, 1998

[51] Int. Cl.[6] .................................................. A45D 24/10
[52] U.S. Cl. ............................................. 34/97; 248/160
[58] Field of Search .................................. 34/90, 91, 96, 34/97; 248/125.9, 284.1, 312, 313, 314, 315, 160

[56] References Cited

U.S. PATENT DOCUMENTS

| | | | |
|---|---|---|---|
| 4,712,313 | 12/1987 | Gettleman | 34/97 |
| 5,064,154 | 11/1991 | Payne | 248/121 |
| 5,172,880 | 12/1992 | McDougall | 248/185 |
| 5,590,475 | 1/1997 | Andis | 34/97 |
| 5,613,305 | 3/1997 | Narrin | 34/90 |
| 5,636,814 | 6/1997 | Wilson | 248/125.9 |
| 5,636,815 | 6/1997 | Wilson | 248/125.9 |
| 5,737,847 | 4/1998 | Britton | 34/97 |
| 5,761,825 | 6/1998 | Ammon et al. | 34/97 |
| 5,832,624 | 11/1998 | Narrin | 34/97 |
| 5,842,670 | 12/1998 | Nigoghosian | 248/160 |

*Primary Examiner*—Henry Bennett
*Assistant Examiner*—Pamela A. Wilson
*Attorney, Agent, or Firm*—Gene Scott-Patent Law Venture Group

[57] ABSTRACT

A stand for a hair dryer includes a base, an adjustable neck and a clamp for gripping the dryer. With the dryer inserted into the clamp, a dryer nozzle is directed in a preferred direction by adjusting the neck of the stand. An upper C-clamp loosely holds the dryer and is sized for encompassing the air moving portion of the dryer. A lower C-clamp holds or grips the dryer and is sized for encompassing the handle of the dryer. Together this clamp system enables insertion and removal of the dryer from the stand, while securely holding the dryer in a selected direction of air flow.

4 Claims, 2 Drawing Sheets

COMBINATION HAIR DRYER AND STAND

BACKGROUND OF THE INVENTION

1. Field of the Invention

This invention relates generally to hair dryers, and more particularly to a novel combination hair dryer and stand having advantages over similar device in the prior art.

2. Description of the Related Art

The following art defines the present state of this field:

Britton, U.S. Pat. No. 5,737,847 describes a telescoping stand with a pivotable holder for a had-held hair dryer is including a stand having a base and a manually and telescopically adjustable pole extending therefrom and terminated at a free end; and a coupling mechanism secured to the free end of the pole for removably holding a hand-held hair dryer and allowing it to be positioned at different angles for use.

Narrin, U.S. Pat. No. 5,613,305 describes a device for providing elevated and universally adjustable support of a hair dryer, the hair dryer having a body with a handle portion and a heating air discharge portion. A receptacle member is provided for gripping the hair dryer by its handle portion and is positioned in the elevated and overhead fashion by an elongated support which is either supported by a floor base or is attached to a vertically extending wall. The receptacle member can take the form of either a pair of laterally displaceable pincer jaws for gripping the dryer handle or a modification of a pedestal and universal ball joint support for providing universally adjustable support to the hair dryer.

Wilson, U.S. Pat. No. 5,636,815 describes a mounting fixture for a hand-held electric hair dryer comprising a base with a support surface and a hollow collar extending perpendicularly therefrom; an elongate rod supported within the hollow collar; and clamping elements on the upper end of the rod. The clamping elements include two planar clamp pads mounted in two dish-like members. The clamping elements are spring biased to accommodate the hair dryer therebetween. The spring bias is achieved either by a yoke formed of spring steel or by two pivotally secured flat members having a compression spring located between adjacent ends of the flat members. The direction of the barrel of the dryer and accordingly the direction of the column of warm air exiting from the barrel can be easily adjusted horizontally and vertically over a wide angular range allowing a user of this type of hair dryer free use of both hands while drying hair.

Payne, U.S. Pat. No. 5,064,154 describes a portable, free standing apparatus is provided to support or cradle a hand-held electric hair dryer at various heights and angles, allowing the operator of these types of hair dryers free use of both hands while drying hair.

The prior art teaches the use of table and floor stands with hair drying equipment. However, the prior art does not teach that a table stand may be configured to have a generally more flexible and more broadly encompassing gripping portion integral with and positioned above a less flexible and less broadly encompassing gripping portion so as to encompass a wide range of portable hair dryers and so as to enable a quick mount and dismount of the dryer with the stand. The present invention fulfills these needs and provides further related advantages as described in the following summary.

SUMMARY OF THE INVENTION

Hair dryers are available commercially in an assortment of sizes and types. These devices are electrically driven and provide electrical heaters for heating air driven by a blower and directed through a nozzle. Typical units provide a handle which allows one to hold the dryer and direct its air flow at the hair so as to dry and style it. Hair dryers are not particularly light in weight so that when they are used to dry a large head of hair that is fully soaked, such drying may take considerable time. Also, styling of the hair is quite time consuming. Therefore, there is needed a hair dryer stand able to support a portable hair dryer while allowing the dryer to be pointed in a range of directions and where the direction may be quickly changed with little effort, while also allowing the dryer to be easily mounted in the stand. The present invention teaches certain benefits in construction and use which give rise to the objectives described below.

The present invention provides a novel stand for a hair dryer, i.e., a dryer and stand combination. The stand includes a base, an adjustable neck and a clamp for gripping the dryer. With the dryer inserted into the clamp, a dryer nozzle is directed in a preferred direction by adjusting the neck of the stand. An upper C-clamp loosely holds the dryer and is sized for encompassing the air moving portion of the dryer. A lower C-clamp encompasses the dryer and is sized for encompassing the handle of the dryer.

A primary objective of the present invention is to provide hair dryer stand having advantages not taught by the prior art.

Another objective is to provide such a stand having a clamping mechanism capable of supporting a wide range sizes of hair dryers.

A further objective is to provide such a stand and dryer combination wherein the dryer is held tightly, yet is able to be easily released by the clamp and whereby the dryer, when mounted in the stand, may be easily pointed in a desired direction.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
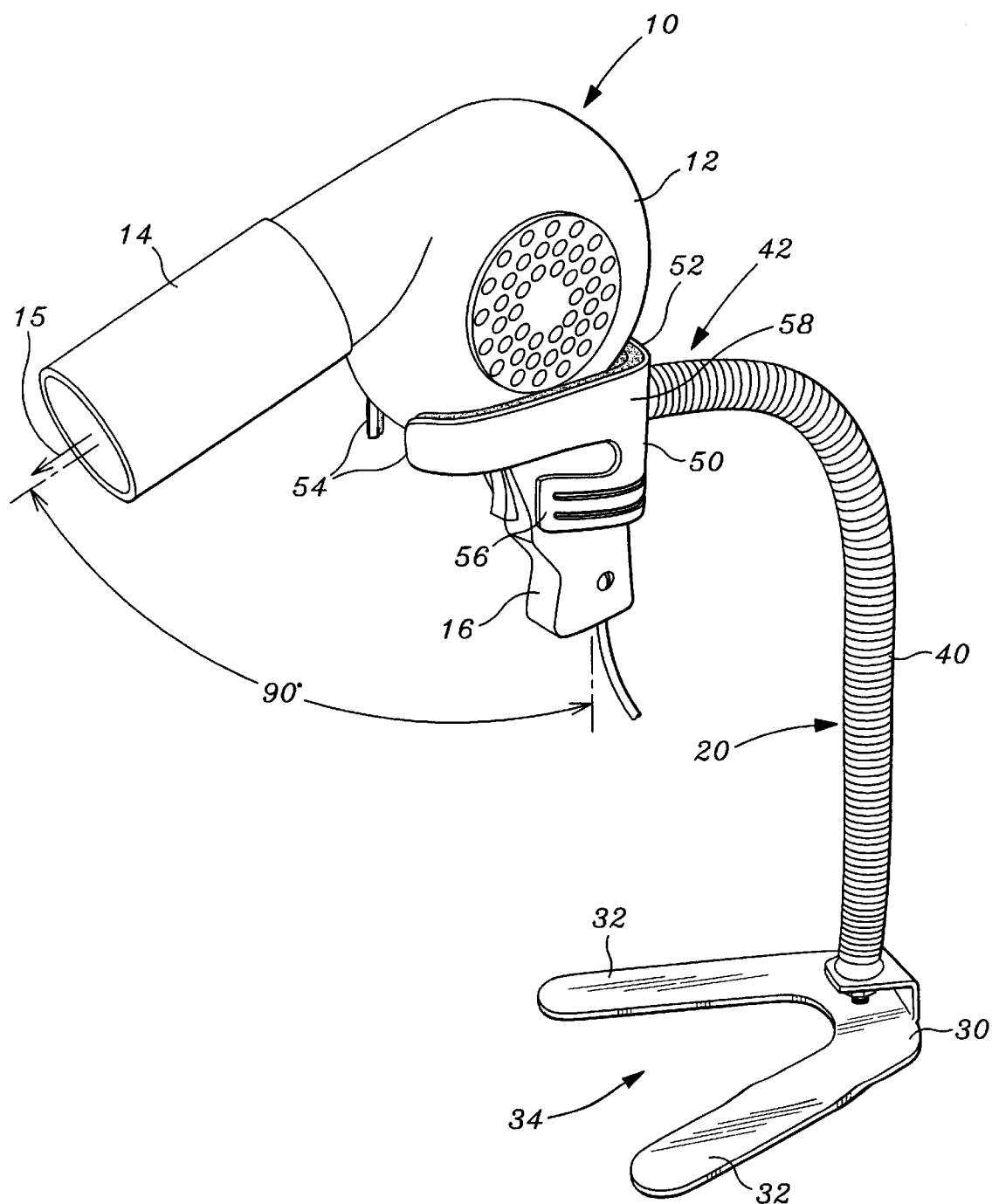
FIG. 1 is a perspective view of the preferred embodiment of the present invention, a hair dryer and hair dryer stand combination.
Figure 2:
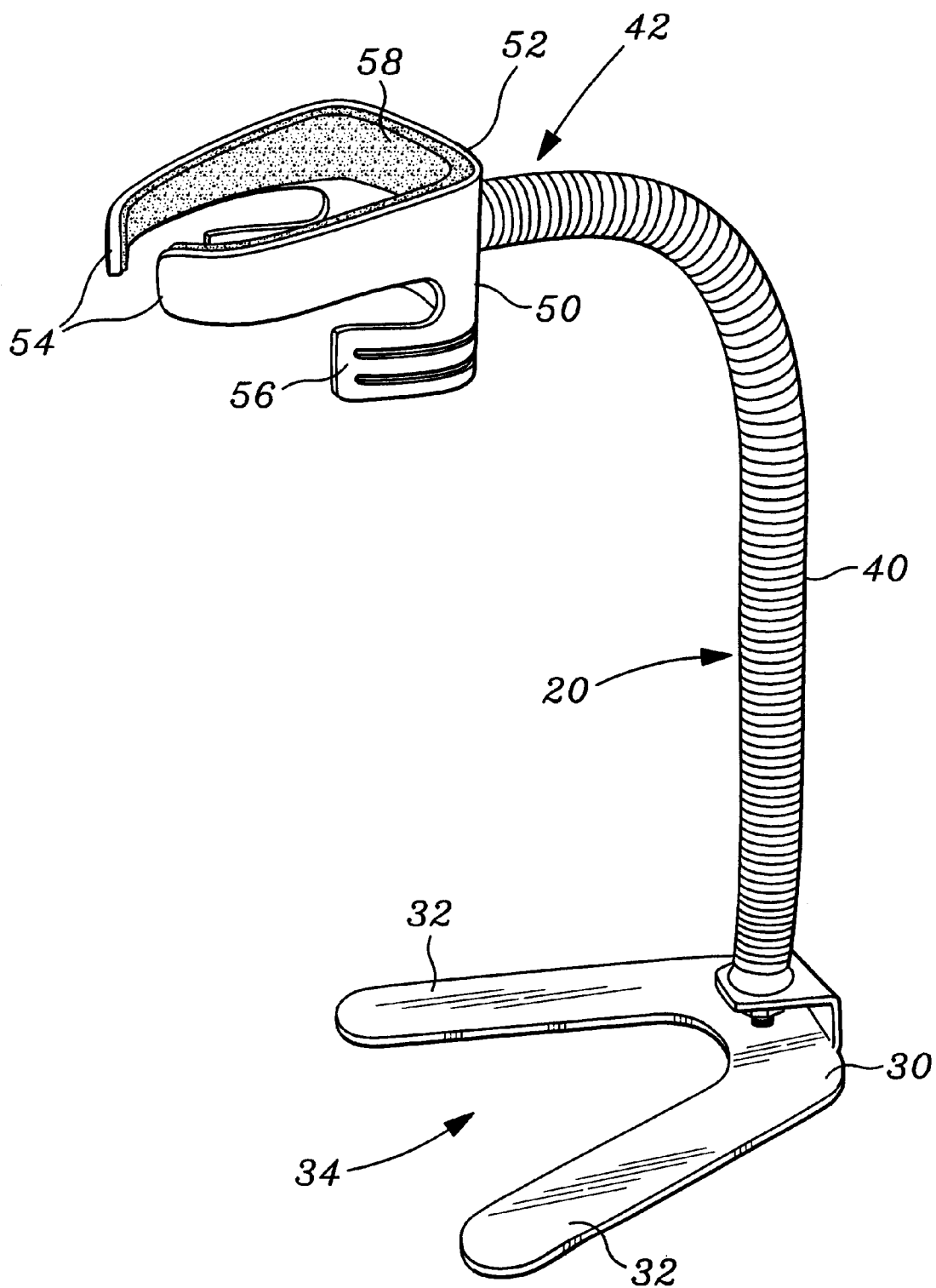
FIG. 2 is a similar perspective view thereof without the hair dryer in place.

The above described drawing figures illustrate the invention, a combination hair dryer 10 and hair dryer stand 20, the hair dryer 10 integrally comprising an air moving portion 12, an air directing portion 14 and a handle portion 16, the handle portion 16 and the air directing portion 14 extending outwardly from the air moving portion 12 and forming an angle of approximately 90° therebetween. The hair dryer stand 20 comprises a stand base 30 adapted for resting on a flat horizontal surface, and, fixedly mounted on the stand base 30, and extending upwardly therefrom, a flexible elongate stand neck 40 terminating at a stand neck distal end 42, adapted for engaging a spine portion 52 of a dryer clamping means 50, the dryer clamping means providing an upper C-clamp 54 adapted for extending loosely around the air moving portion 12 of the hair dryer 10 and a lower C-clamp 56 adapted for extending around the handle portion 16 of the hair dryer 10, the upper and the lower C-clamps 54, 56 sharing the spine portion 52 in common and extending away from the spine portion 52 in a common corresponding direction 15, such that with the hair dryer 10 placed into the hair dryer stand 20 with the handle portion 16 directed downwardly, the air directing portion 14 is directed in the common corresponding direction 15 of the C-clamps 54, 56, said direction 15 being adjustable by bending the flexible elongate stand neck 40 as desired for directing an outward flow of air from the air directing portion 14.

Preferably, the stand base 30 is provided with a pair of feet 32 separated to form a "V" shape, a space 34 between the feet 32 being directed in the common corresponding direction 15. Also, the elongate stand neck 40 is preferably constructed as a goose neck or an equivalent thereto.

Preferably, the spine portion 52 provides a cushioning means 58 fixed thereto within the upper C-clamp 54 and positioned so as to receive the air moving portion 12 thereagainst in such a manner as to cradle the hair dryer 10 and to prevent vibration of the hair dryer against the C-clamp 54. The cushioning means 58 and the resiliency of the upper C-clamp work together so that the clamp opens as necessary to grip the hair dryer yet insulates the clamp from the dryer so that vibration is not transmitted to the base.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A combination hair dryer and hair dryer stand, the combination comprising;
   a hair dryer integrally comprising an air moving portion, an air directing portion and a handle portion, the handle portion and the air directing portion extending outwardly from the air moving portion and forming an angle of approximately 90° therebetween;
   a hair dryer stand comprising:
      a stand base adapted for resting on a flat horizontal surface, and fixedly mounted on the stand base, and extending upwardly therefrom,
      a flexible elongate stand neck terminating at a stand neck distal end, adapted for engaging, a spine portion of a dryer clamping means,
      the dryer clamping means providing an upper C-clamp adapted for extending loosely around the air moving portion of the hair dryer and a lower C-clamp adapted for extending loosely around the handle portion of the hair dryer, the upper and the lower C-clamps extending from the spine in a common direction;
      the clamping means further providing a cushioning means fixed to the upper C-clamp such that with the hair dryer placed into the C-clamps with the handle portion directed downwardly, the air directing portion is positioned for directing an outward flow of air in the common direction of the C-clamps, said direction being adjustable by bending the flexible elongate stand neck as desired for directing from the air directing portion, and the upper C-clamp, being of such resiliency as to flex so as to cradle the hair dryer in contact with the cushioning means.

2. The combination of claim 1 wherein the elongate stand neck is constructed as a goose type neck so as to be easily adjusted in shape for directing the hair dryer air flow.

3. A hair dryer stand comprising:
   a hair dryer stand comprising:
      a stand base adapted for resting on a flat horizontal surface, and fixedly mounted on the stand base, and extending upwardly therefrom,
      a flexible elongate stand neck terminating at a stand neck distal end, adapted for engaging,
      a spine portion of a dryer clamping means;
      the dryer clamping means providing an upper C-clamp adapted for extending loosely around an air moving portion of a hair dryer and a lower C-clamp adapted for extending loosely around a handle portion of the hair dryer, the upper and the lower C-clamps extending from the spine in a common direction;
      the clamping means further providing a cushioning means fixed to the upper C-clamp such that with the hair dryer placed into the C-clamps with the handle portion directed downwardly, the air directing portion is positioned for directing an outward flow of air in the common direction of the C-clamps, said direction being adjustable by bending the flexible elongate stand neck as desired for directing from the air directing portion, and the upper C-clamp, being of such resiliency as to flex so as to cradle the hair dryer in contact with the cushioning means.

4. The combination of claim 3 wherein the elongate stand neck is constructed as a goose type neck.

* * * * *